United States Patent [19]

Alfter et al.

[11] Patent Number: 5,716,446
[45] Date of Patent: Feb. 10, 1998

[54] ISOINDOLINE PIGMENTS BASED ON AMINOQUINOXALINEDIONES

[75] Inventors: Frank Alfter; Rüdiger Jung, both of Kelkheim; Gustav Kapaun, Bad Soden, all of Germany

[73] Assignee: Hoechst Aktiengesellschaft, Frankfurt, Germany

[21] Appl. No.: 643,593

[22] Filed: May 6, 1996

[30] Foreign Application Priority Data

May 8, 1995 [DE] Germany .................. 195 16 804.6

[51] Int. Cl.⁶ ........................................... C09B 57/04
[52] U.S. Cl. ................... 106/498; 106/493; 106/31.77; 106/31.78; 544/248; 544/353; 544/354; 544/355; 544/356; 548/471; 548/482
[58] Field of Search ........................... 106/498, 493, 106/31.77, 31.78; 544/248, 353, 354, 355, 356; 548/471, 482

[56] References Cited

U.S. PATENT DOCUMENTS

| | | | |
|---|---|---|---|
| 4,051,099 | 9/1977 | von der Crone | 524/93 |
| 4,052,410 | 10/1977 | Von der Crone et al. | 548/305 |
| 4,746,740 | 5/1988 | Lotsch et al. | 106/498 |
| 4,970,310 | 11/1990 | Von Der Crone | 106/498 |

FOREIGN PATENT DOCUMENTS

| | | |
|---|---|---|
| 1670748 | 5/1973 | Germany. |
| 2425594 | 12/1974 | Germany. |
| 35 33 545 A1 | 5/1987 | Germany. |
| 1187667 | 4/1970 | United Kingdom. |

OTHER PUBLICATIONS

Derwent Abstract 87–151002/22 of DE 3,533,545, "New Isoindoline Dyestuffs . . . ", Lotsch, W., May 1987.

Primary Examiner—Mark L. Bell
Assistant Examiner—Scott L. Hertzog
Attorney, Agent, or Firm—Connolly and Hutz

[57] ABSTRACT

Novel isoindoline pigments of the formula (I):

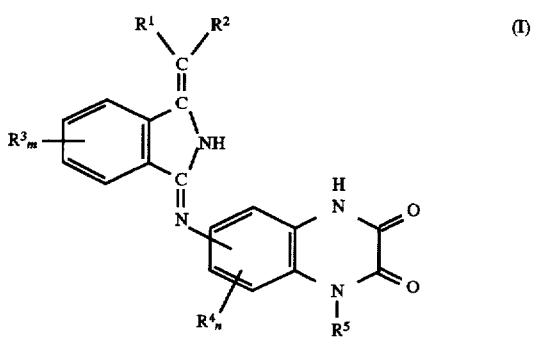

in which $R^1$ is —CN;

$R^2$ is —CN or a saturated or unsaturated, aromatic or non-aromatic, 5- to 7-membered heterocyclic ring system which can be modified by fusion or bridging with other heterocyclic or isocyclic ring systems, the heteroatoms being N, O and/or S;

or a group —CO—NR⁶R⁷, in which $R^6$ and $R^7$ are identical or different and are hydrogen or $C_1$–$C_4$-alkyl;

or a group —CO—NR⁶R⁸, in which $R^8$ is a saturated or unsaturated, aromatic or non-aromatic, 5- to 7-membered isocyclic or heterocyclic ring which is unsubstituted or substituted by one to 5 of the following radicals: $C_1$–$C_4$-alkyl, halogen, trifluoromethyl, $C_1$–$C_4$-alkoxy, carbomethoxy, carbethoxy, carboxamide, carboxamide substituted by a $C_1$–$C_4$-alkyl or phenyl group, nitro, $C_1$–$C_4$-acylamino or hydroxyl, and which can be modified by fusion or bridging with other heterocyclic or isocyclic ring systems, the heteroatoms being N, O and/or S; or in which $R^1$ and $R^2$ together are a saturated or unsaturated, aromatic or non-aromatic, 5- to 7-membered heterocyclic ring which is unsubstituted or substituted by one to 5 of the following radicals: $C_1$–$C_4$-alkyl, $C_1$–$C_4$-alkoxy, halogen, trifluoromethyl, carbomethoxy, carbethoxy, carboxamide, carboxamide substituted by a $C_1$–$C_4$-alkyl or phenyl group, $C_1$–$C_4$-acylamino or hydroxyl, and which can be modified by fusion or bridging with other heterocyclic or isocyclic ring systems, the heteroatoms being N, O and/or S;

the radicals $R^3$ and $R^4$ are identical or different and are defined as follows:

$R^3$ is hydrogen, $C_1$–$C_4$-alkyl, phenyl, $C_1$–$C_4$-alkoxy, halogen or $C_1$–$C_4$-acylamino;

$R^4$ is hydrogen, $C_1$–$C_4$-alkyl, halogen, trifluoromethyl, methoxy, ethoxy or nitro;

m is a number from 1 to 4;

n is a number from 1 to 3; and $R^5$ is hydrogen or $C_1$–$C_4$-alkyl.

12 Claims, No Drawings

ISOINDOLINE PIGMENTS BASED ON AMINOQUINOXALINEDIONES

The present invention relates to novel isoindoline pigments based on aminoquinoxalinediones.

DE-A-1 670 748 (GB-A-1 187 667; U.S. Pat. No. 3,794,659) describes isoindolines based on heterocyclic amines, some of which possess pigmentary properties but no longer meet the modern demands on pigments in respect of temperature stability and fastness to bleeding.

DE-A-24 25 594 (U.S. Pat. No. 3,979,386; U.S. Pat. No. 4,052,410) discloses tri- to tetra-halogenated iminoisoindolinone pigments containing a carbonyl group or another imino group in the 3-position, symmetrical isoindolines being formed in the latter case. The products are ecologically unacceptable because of their high chlorine content.

The object of the present invention was to provide novel isoindoline pigments which satisfy the modern demands on pigments.

It has been found that this object is achieved by asymmetrical isoindolines based on aminoquinoxalinediones.

The present invention provides an isoindoline pigment of the formula (I):

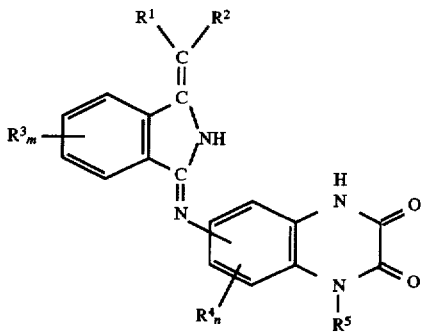

in which $R^1$ is —CN;

$R^2$ is —CN or a saturated or unsaturated, aromatic or non-aromatic, 5- to 7-membered heterocyclic ring system which can be modified by fusion or bridging with other heterocyclic or isocyclic ring systems, the heteroatoms being N, O and/or S;

or a group —CO—NR$^6$R$^7$, in which $R^6$ and $R^7$ are identical or different and are hydrogen or $C_1$–$C_4$-alkyl;

or a group —CO—NR$^6$R$^8$, in which $R^8$ is a saturated or unsaturated, aromatic or non-aromatic, 5- to 7-membered isocyclic or heterocyclic ring which is unsubstituted or substituted by one to 5 of the following radicals: $C_1$–$C_4$-alkyl, halogen, trifluoromethyl, $C_1$–$C_4$-alkoxy, carbomethoxy, carbethoxy, carboxamide, carboxamide substituted by a $C_1$–$C_4$-alkyl or phenyl group, nitro, $C_1$–$C_4$-acylamino or hydroxyl, and which can be modified by fusion or bridging with other heterocyclic or isocyclic ring systems, the heteroatoms being N, O and/or S; or in which $R^4$ and $R^2$ together are a saturated or unsaturated, aromatic or non-aromatic, 5- to 7-membered heterocyclic ring which is unsubstituted or substituted by one to 5 of the following radicals: $C_1$–$C_4$-alkyl, $C_1$–$C_4$-alkoxy, halogen, trifluoromethyl, carbomethoxy, carbethoxy, carboxamide, carboxamide substituted by a $C_1$–$C_4$-alkyl or phenyl group, $C_1$–$C_4$-acylamino or hydroxyl, and which can be modified by fusion or bridging with other heterocyclic or isocyclic ring systems, the heteroatoms being N, O and/or S;

the radicals $R^3$ and $R^4$ are identical or different and are defined as follows:

$R^3$ is hydrogen, $C_1$–$C_4$-alkyl, phenyl, $C_1$–$C_4$-alkoxy, halogen or $C_1$–$C_4$-acylamino;

$R^4$ is hydrogen, $C_1$–$C_4$-alkyl, halogen, trifluoromethyl, methoxy, ethoxy or nitro;

m is a number from 1 to 4;

n is a number from 1 to 3; and $R^5$ is hydrogen or $C_1$–$C_4$-alkyl.

Of particular interest are isoindoline pigments of the formula (I) in which $R^1$ is —CN; and $R^2$ is —CN or a benzimidazol-2-yl radical, a quinazolon-2-yl radical, a quinoxal-2-yl radical or a quinolin-2-yl radical;

or a group —CO—NR$^6$R$^7$ in which $R^6$ and $R^7$ are identical or different and are hydrogen, methyl or ethyl;

or a group —CO—NR$^6$R$^8$ in which $R^8$ is a phenyl ring or naphthyl ring, a phenyl ring or naphthyl ring substituted by one to 5 halogen atoms or COO ($C_1$–$C_4$)-alkyl, CONH$_2$, $C_1$–$C_4$-alkyl, $C_1$–$C_4$-alkoxy, CF$_3$ or OH groups, or a benzimidazolyl, benzimidazolonyl or quinoxalyl ring; or in which $R^1$ and $R^2$ together form a heterocyclic ring selected from the group comprising barbituric acid, 2,4-dioxo-1,2,3,4-tetrahydroquinoline and thionaphthene.

Of particular interest are isoindoline pigments of the formula (I) in which $R^3$ is hydrogen, methyl, ethyl, phenyl, methoxy, ethoxy, fluorine, chlorine, bromine or acetylamino;

$R^4$ is hydrogen, methyl, ethyl, fluorine, chlorine, bromine, trifluoromethyl, methoxy or ethoxy; and $R^5$ is hydrogen, methyl or ethyl.

Of very particular interest are isoindoline pigments of the formula (I) in which $R^1$ is —CN;

$R^2$ is —CN, benzimidazol-2-yl, —CONH$_2$, —CONHC$_6$H$_5$, —CONHC$_6$H$_4$Cl, —CONHC$_6$H$_3$Cl$_2$, —CONHC$_6$H$_4$CH$_3$, —CONHC$_6$H$_4$COOC$_2$H$_5$, —CONHCONH$_2$, —CONHC$_6$H$_4$COOCH$_3$, —CONHC$_6$H$_3$ (COOCH$_3$)$_2$ or —CONH-naphthyl;

$R^3$ is hydrogen;

$R^4$ is hydrogen, Cl, OCH$_3$ or CH$_3$;

n is the number 1; and $R^5$ is hydrogen.

Also of particular interest are isoindoline pigments of the formula (I) in which $R^1$ and $R^2$ together form a barbituric acid, methylbarbituric acid, phenylbarbituric acid, 2,4-dioxo-1,2,3,4-tetrahydroquinoline or 3-hydroxythionaphthene ring.

The present invention also provides a process for the preparation of an isoindoline pigment, wherein a) an isoindoline of the formula (II):

which contains nucleophilically exchangeable radicals X and Y in the 1-and 3-positions, is reacted with a compound of the formula (III):

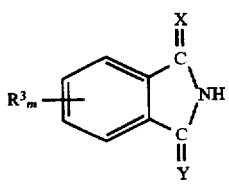

  (III)

in which the H atoms of the —CH$_2$— group are CH-acidic, to form a compound of the formula (IV):

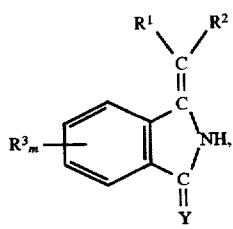  (IV)

and then b) the compound of the formula (IV) is reacted with a quinoxalinedione of the formula (V):

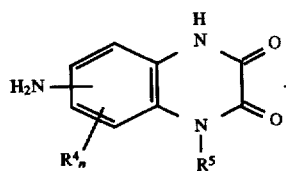  (V)

Starting from isoindolines containing readily exchangeable substituents in the 1-and 3-positions, such as those known in the literature, the condensation step a) is carried out with compounds which have two readily exchangeable, active hydrogen atoms on one carbon atom.

Examples of suitable reactive isoindolines of the formula (II) are those in which the radical X is an imino group or a (hemi)aminal or ketal grouping and the radical Y is an imino group, for example 1,3-diiminoisoindoline (DE-A-879100):

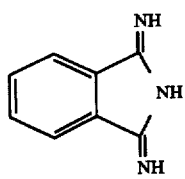

and the tautomeric forms thereof, as well as its glycol addition product:

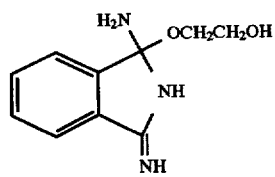

or 1,1-dialkoxyisoindolines:

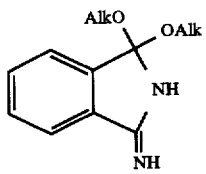  (II)

in which Alk are alkyl groups, preferably C$_1$–C$_4$-alkyl groups (DE-A-879102).

For example, 1-amino-1-(2-hydroxyethoxy)-3-iminoisoindoline reacts according to the following scheme:

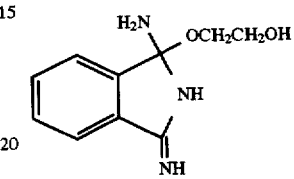

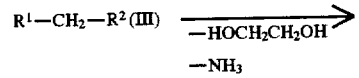

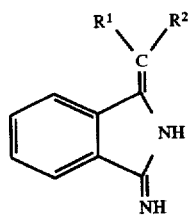

In the above reaction scheme, the educt is shown in one of its possible tautomeric forms.

Examples of suitable compounds of the formula (III) are malodinitrile; cyanoacetic acid amides such as e.g. cyanoacetamide, cyanoacetic acid methylamide, cyanoacetic acid ethylamide, cyanoacetic acid phenylamide, cyanoacetic acid 4-chlorophenylamide, cyanoacetic acid 2-chlorophenylamide, cyanoacetic acid 2,4-dichlorophenylamide, cyanoacetic acid 2-tolylamide, cyanoacetic acid 3-tolylamide, cyanoacetic acid 4-tolylamide, cyanoacetic acid 4-carbethoxyphenylamide, cyanoacetic acid 4-carboxamidophenylamide, cyanoacetic acid 3,5-dicarbomethoxyphenylamide, cyanoacetic acid 4-acetylaminophenylamide, cyanoacetic acid 2-methoxyphenylamide and cyanoacetic acid naphthylamide, it being possible for the aromatic radicals to be substituted by one or more ethoxy, bromine, fluorine and/or trifluoromethyl radicals; compounds of the formula NC—CH$_2$-Het, Het being a heterocyclic ring, for example 2-(cyanomethyl)benzimidazole, 2-(cyanomethyl)quinazolinone or 2-(cyanomethyl)quinoline; and heterocyclic ring systems of the formula

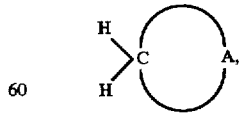

in which A and C together form a five- to seven-membered heterocyclic ring which, if appropriate, is fused with other isocyclic or heterocyclic rings, for example barbituric acid, methylbarbituric acid, phenylbarbituric acid, 2,4-dioxo-1,2,3,4-tetrahydroquinoline and 3-hydroxythionaphthene.

Solvents which can be used in this first condensation step are preferably alcohols such as e.g. methanol, ethanol and propanol. It is also possible in some cases to use water and aqueous alcohols at room temperature or up to the boiling point of the solvents.

If very reactive methylene compounds are used, e.g. 2-(cyanomethyl)benzimidazole, undesired disubstituted isoindolines may already be formed in this first reaction step. This undesired secondary condensation can be counteracted by carrying out the reaction at the lowest possible temperature, conveniently at 30° to 60° C., preferably at 45° to 55° C., and with less than the stoichiometric amount of the reactive methylene compound. A convenient molar ratio of the reactive methylene compound of the formula (III) to the isoindoline of the formula (II) is 0.8:1 to 0.98:1, preferably 0.85:1 to 0.97:1.

It has furthermore been found, according to the invention, that this undesired secondary condensation is also counteracted by adjusting the pH to a suitable value. The optimum pH range must be determined in each individual case and, e.g. when using 2-(cyanomethyl)benzimidazole, is preferably in the range 5 to 9, particularly preferably in the range 6 to 8.5.

The second condensation step is carried out with aminoquinoxalinediones of the formula (V) and proceeds e.g. according to the following scheme:

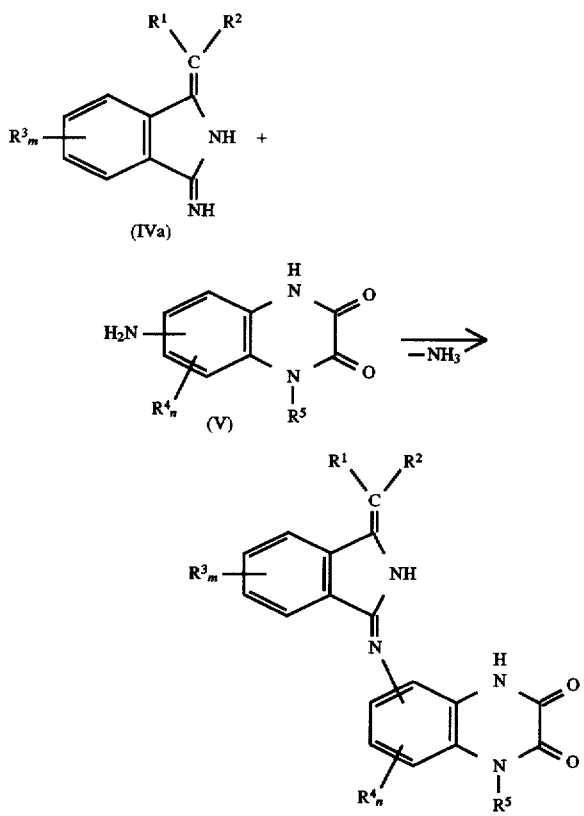

Suitable compounds of the formula (V) are preferably 6-aminoquinoxalinedione, 6-amino-7-chloroquinoxalinedione, 6-amino-7-methylquinoxalinedione, 6-amino-7-methoxyquinoxalinedione and 6-amino-1-methylquinoxalinedione.

The reaction takes place under acid catalysis, it being possible, for example, for acetic acid or propionic acid to be used as both catalyst and solvent at the same time.

Examples of suitable solvents for the second condensation step are N-methylpyrrolidone, dimethylformamide, alcohols such as methanol, and mixtures of said solvents with water. The molar ratios of the compound of the formula (IV) or (IVa) to the quinoxalinedione of the formula (V) are conveniently 1:1 to 1:1.2.

The crude pigments produced by the process according to the invention can be comminuted by a mechanical process, for example by wet or dry grinding, or by chemical processes.

The final adjustment can be effected by a finishing process in a water-based and/or solvent-based system, if appropriate with the incorporation of conventional additives.

The pigments according to the invention are particularly suitable for pigmenting high-molecular organic materials. Examples of high-molecular organic materials are cellulose ethers and esters such as ethyl cellulose, nitrocellulose, cellulose acetate and cellulose butyrate, natural resins or synthetic resins such as polymerization resins or condensation resins, e.g. aminoplasts, especially urea/formaldehyde and melamine/formaldehyde resins, alkyd resins, acrylic resins and phenoplasts, polycarbonates, polyolefins such as polystyrene, polyvinyl chloride, polyethylene and polypropylene, polyacrylonitrile, polyacrylic acid esters, polyamides, polyurethanes or polyesters, rubber, casein, silicone and silicone resins, individually or in mixtures.

It is immaterial whether the high-molecular organic compounds mentioned exist in the form of plastic materials, melts, spinning dopes, lacquers, paints or printing inks. Depending on the intended application, it proves advantageous to use the pigment formulations obtained according to the invention as blends or in the form of preparations or dispersions. The pigments according to the invention are used in an amount preferably of 0.1 to 10% by weight, based on the high-molecular organic material to be pigmented.

Features of the isoindoline pigments according to the invention are their particularly good fastness to overpainting, fastness to bleeding and high temperature stability.

The isoindoline pigments according to the invention are also suitable as coloring agents in electrophotographic toners and developers, e.g. one- or two-component powder toners (also called one- or two-component developers), magnetic toners, liquid toners, polymerization toners and other special toners (L. B. Schein, "Electrophotography and Development Physics"; Springer Series in Electrophysics 14, Springer Verlag, 2nd edition, 1992).

Typical toner binders are polymerization, polyaddition and polycondensation resins such as styrene, styrene/acrylate, styrene/butadiene, acrylate, polyester and phenolic epoxy resins, polysulfones, polyurethanes, individually or in combination, and polyethylene and polypropylene, which can also contain other ingredients such as charge controllers, waxes or flow aids, or can have said ingredients added at a later stage.

Furthermore, the isoindoline pigments according to the invention are suitable as coloring agents in powders and powder coatings, especially in powder coatings which can be sprayed triboelectrically or electrokinetically and which are used for the surface coating of objects made of e.g. metal, wood, plastic, glass, ceramic, concrete, textile material, paper or rubber (J. F. Hughes, "Electrostatics Powder-Coating" Research Studies Press, John Wiley & Sons, 1984).

Powder coating resins which are typically used are epoxy resins, polyester resins containing carboxyl and hydroxyl groups, polyurethane resins and acrylic resins, together with conventional hardeners. Combinations of resins are also used. Thus, for example, epoxy resins are frequently used in combination with polyester resins containing carboxyl and hydroxyl groups. Examples of typical hardener components (depending on the resin system) are acid anhydrides, imidazoles and dicyandiamide and derivatives thereof, capped isocyanates, bisacylurethanes, phenolic and melamine resins, triglycidyl isocyanurates, oxazolines and dicarboxylic acids.

The isoindoline pigments according to the invention are also suitable as coloring agents in water-based and non water-based ink-jet inks and in inks which work by the hot-melt method.

In the Examples which follow, parts are by weight and "of theory" means "of the theoretical yield".

PREPARATIVE EXAMPLES

Example 1 a) 1-[(Cyanophenylcarbamoyl)methylene]-3-iminoisoindoline

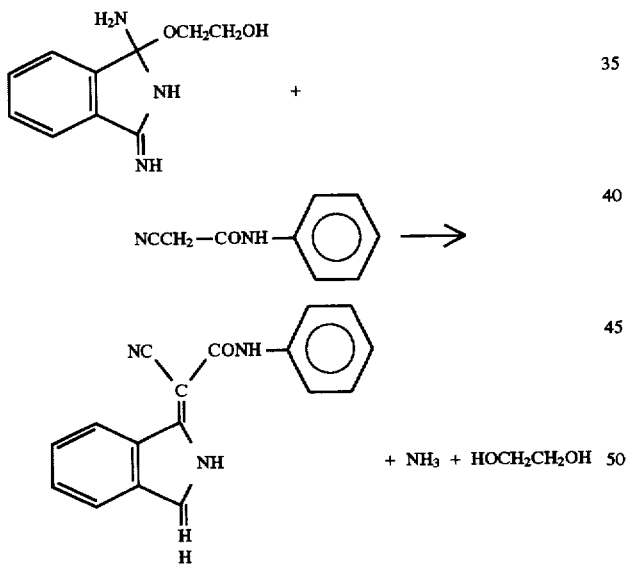

227.6 parts of 1-amino-1-(2-hydroxyethoxy)-3-iminoisoindoline (1.1 mol) and 160.2 parts of N-phenylcyanoacetamide (1.0 mol) are introduced into 2400 parts of methanol and the mixture is refluxed for 6 hours, with stirring. A yellow precipitate forms. After cooling, the precipitate is filtered off with suction at room temperature and the filter cake is washed thoroughly with methanol and dried at 60° C. under vacuum. Weight: 281.0 parts=98% of theory.

b)

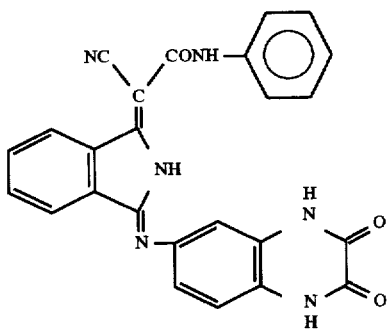

20.2 parts of 1-[(cyanophenylcarbamoyl)methylene]-3-iminoisoindoline (0.07 mol) and 13.1 parts of 6-aminoquinoxalinedione (0.074 mol) are introduced into 580 parts of glacial acetic acid and the mixture is stirred for 1 hour at room temperature. It is heated to the boil and stirred for 3 hours at the boiling point. 300 parts of dimethylformamide (DMF) are then added and the mixture is stirred for 3 hours at 130° to 135° C. The product is filtered off with suction at 90° to 100° C. and washed with 1000 parts of glacial acetic acid/DMF (2:1) at 90° to 100° C. It is then washed with methanol and water and dried under vacuum at 60° C. Weight: 25.6 parts=82% of theory.

If this crude pigment is processed e.g. in a solvent-type vibratory mill, a pigment is obtained which colors PVC and polyethylene yellow.

Example 2 a) 1,1-Dimethoxy-3-iminoisoindoline 25.6 parts of o-phthalodinitrile (0.2 mol) are stirred into 200 parts of methanol. 4.5 parts of a 30% solution of sodium methylate in methanol (0.025 mol) are added at 20° C. and the mixture is stirred for 16 hours at 20° C. to give a solution of 1,1-dimethoxy-3-iminoisoindoline.

b) 1-[(Cyanobenzimidazol-2'-yl)methylene]-3-iminoisoindoline 9.6 parts of acetic acid and 13.5 parts of sodium bicarbonate are added to the 1,1-dimethoxy-3-iminoisoindoline solution obtained according to a). A solution of 28.3 parts of 2-(cyanomethyl)benzimidazole (0.18 mol) in 200 parts of methanol is added dropwise to this milky suspension at room temperature. The mixture is then heated for 4 hours at 50° C., with stirring. The product is filtered off with suction at room temperature, washed with methanol and then with water and dried at 60° C. under vacuum. Weight: 49.1 parts=96% of theory.

If the synthesis is carried out according to 2b) and the addition of sodium bicarbonate is omitted, a considerable proportion of the undesired by-product 1,3-bis[(cyanobenzimidazol-2'-yl)methylene]isoindoline is formed.

c) Second Condensation Step with 6-aminoquinoxalinedione 28.5 parts of 1-[(cyanobenzimidazol-2'-yl)methylene]-3-iminoisoindoline (0.1 mol) and 17.7 parts of 6-aminoquinoxalinedione (0.1 mol) are introduced into 1300 parts of glacial acetic acid and the mixture is stirred for 1 hour at room temperature. It is heated to the boil and stirred for 3 hours at the boiling point. 650 parts of dimethylformamide (DMF) are then added and the mixture is stirred for 4 hours at 130° to 135° C. The product is filtered off with suction at 90°–100° C. and washed with 1000 parts of glacial acetic acid/DMF (2:1) at 90° to 100° C. and then with methanol and water. The orange pigment obtained is dried under vacuum at 60° C. Weight: 37.7 parts=85% of theory.

If a procedure analogous to Examples 1 and 2 is carried out in which the N-phenylcyanoacetamide and 2-(cyanomethyl)benzimidazole are replaced with other methylene-active compounds, and the resulting monocondensation products and 6-aminoquinoxalinedione are reacted in a second condensation step, the valuable pigments listed in Table 1 below are similarly obtained.

TABLE 1

| Ex. no. | Component in the 1st condensation step | Color of the reaction product with 6-amino-quinoxalinedione |
|---|---|---|
| 3 | NC—CH$_2$C(=O)—NH$_2$ | yellow |
| 4 | NC—CH$_2$C(=O)—N(H)—CH$_3$ | yellow |
| 5 | NC—CH$_2$C(=O)—N(H)—C$_2$H$_5$ | yellow |
| 6 | NC—CH$_2$C(=O)—N(H)—naphthyl | yellow |
| 7 | NC—CH$_2$C(=O)—NH—(2-CH$_3$-phenyl) | yellow |
| 8 | NC—CH$_2$C(=O)—NH—(2-OCH$_3$-phenyl) | yellow |

TABLE 1-continued

| Ex. no. | Component in the 1st condensation step | Color of the reaction product with 6-amino-quinoxalinedione |
|---|---|---|
| 9 | NC—CH$_2$C(=O)—NH—(4-OCH$_3$-phenyl) | yellow |
| 10 | NC—CH$_2$C(=O)—NH—(2-OC$_2$H$_5$-phenyl) | yellow |
| 11 | NC—CH$_2$C(=O)—NH—(4-OC$_2$H$_5$-phenyl) | yellow |
| 12 | NC—CH$_2$C(=O)—NH—(3,5-bis-COOCH$_3$-phenyl) | orange |
| 13 | NC—CH$_2$C(=O)—NH—(3,4-bis-COOCH$_3$-phenyl) | yellow |
| 14 | barbituric acid (HN—C(=O)—NH between two C=O with central CH$_2$) | brown |

If methylene-active compounds according to Table 2 are used in the 1st condensation step and the product is condensed in the 2nd step with 6-amino-7-methylquinoxalinedione, valuable pigments are similarly obtained.

TABLE 2

| Ex. no. | Component in the 1st condensation step | Color of the reaction product with 6-amino-7-methyl-quinoxalinedione |
|---|---|---|
| 15 | 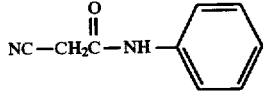 | yellow |
| 16 | 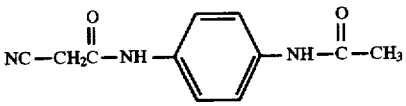 | brown |
| 17 | 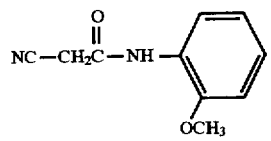 | yellow |
| 18 | 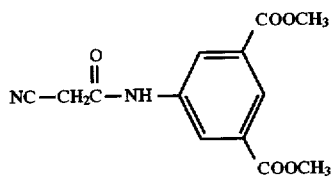 | orange |
| 19 | 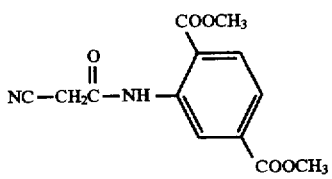 | yellow |
| 20 | 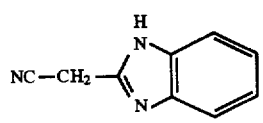 | orange |

If methylene-active compounds according to Table 3 are used in the 1st condensation step and the product is condensed in the 2nd step with 6-amino-7-methoxyquinoxalinedione, valuable pigments are similarly obtained.

TABLE 3

| Ex. no. | Component in the 1st condensation step | Color of the reaction product with 6-amino-7-methoxy-quinoxalinedione |
|---|---|---|
| 21 | NC—CH₂C(=O)—NH₂ | red |
| 22 | NC—CH₂C(=O)—NH—(3-Cl-phenyl) | orange |

We claim:
1. An isoindoline pigment of the formula (I):

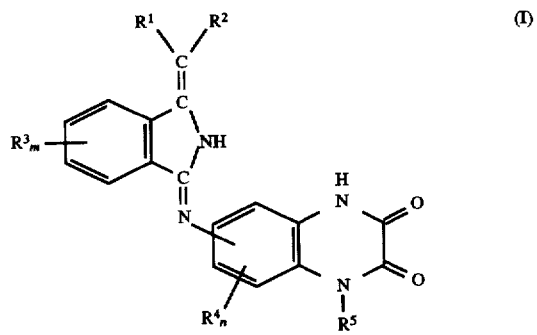

in which
R¹ is —CN;
R² is —CN or a saturated or unsaturated, aromatic or non-aromatic, 5- to 7-membered heterocyclic ring system which is optionally modified by fusion or bridging with other heterocyclic or isocyclic ring systems, the heteroatoms being N, O, S or a combination thereof; or a group —CO—NR⁶R⁷, in which R⁶ and R⁷ are identical or different and are hydrogen or C₁–C₄-alkyl;

or a group —CO—NR⁶R⁸, in which R⁸ is a saturated or unsaturated, aromatic or non-aromatic, 5- to 7-membered isocyclic or heterocyclic ring which is unsubstituted or substituted by one to 5 of the following radicals: $C_1$–$C_4$-alkyl, halogen, trifluoromethyl, $C_1$–$C_4$-alkoxy, carbomethoxy, carbethoxy, carboxamide, carboxamide substituted by a $C_1$–$C_4$-alkyl or phenyl group, nitro, $C_1$–$C_4$-acylamino or hydroxyl, and which is optionally modified by fusion or bridging with other heterocyclic or isocyclic ring systems, the heteroatoms being N, O, S or a combination thereof; or in which $R^1$ and $R^2$ together are a saturated or unsaturated, aromatic or non-aromatic, 5- to 7-membered heterocyclic ring which is unsubstituted or substituted by one to 5 of the following radicals: $C_1$–$C_4$-alkyl, $C_1$–$C_4$-alkoxy, halogen, trifluoromethyl, carbomethoxy, carbethoxy, carboxamide, carboxamide substituted by a $C_1$–$C_4$-alkyl or phenyl group, $C_1$–$C_4$-acyl amino or hydroxyl, and which is optionally modified by fusion or bridging with other heterocyclic or isocyclic ring systems, the heteroatoms being N, O, S or a combination thereof; the radicals $R^3$ and $R^4$ are identical or different and are defined as follows:

$R^3$ is hydrogen, $C_1$–$C_4$-alkyl, phenyl, $C_1$–$C_4$-alkoxy, halogen or $C_1$–$C_4$-acylamino;

$R^4$ is hydrogen, $C_1$–$C_4$-alkyl, halogen, trifluoromethyl, methoxy, ethoxy or nitro;

m is a number from 1 to 4;

n is a number from 1 to 3; and $R^5$ is hydrogen or $C_1$–$C_4$-alkyl.

2. An isoindoline pigment as claimed in claim 1, wherein $R^1$ is —CN; and $R^2$ is —CN or a benzimidazol-2-yl radical, a quinazolon-2-yl radical, a quinoxal-2-yl radical or a quinolin-2-yl radical;

or a group —CO—NR⁶R⁷ in which R⁶ and R⁷ are identical or different and are hydrogen, methyl or ethyl;

or a group —CO—NR⁶R⁸ in which R⁸ is a phenyl ring or naphthyl ring, a phenyl ring or naphthyl ring substituted by 1 to 5 halogen atoms or COO($C_1$–$C_4$)-alkyl, acetylamino, CONH₂, $C_1$–$C_4$-alkyl, $C_1$–$C_4$-alkoxy, CF₃ or hydroxyl groups, or a benzimidazolyl, benzimidazolonyl or quinoxalyl ring; or wherein $R^1$ and $R^2$ together form a heterocyclic ring selected from the group consisting of barbituric acid, 2,4-dioxo-1,2,3,4-tetrahydroquinoline and thionaphthene.

3. An isoindoline pigment as claimed in claim 1, wherein $R^3$ is hydrogen, methyl, ethyl, phenyl, methoxy, ethoxy, fluorine, chlorine, bromine or acetylamino;

$R^4$ is hydrogen, methyl, ethyl, fluorine, chlorine, bromine, trifluoromethyl, methoxy or ethoxy; and $R^5$ is hydrogen, methyl or ethyl.

4. An isoindoline pigment as claimed in claim 1, wherein $R^1$ is —CN;

$R^2$ is —CN, benzimidazol-2-yl, —CONH₂, —CONHC₆H₅, —CONHC₆H₄Cl, —CONHC₆H₃Cl₂, —CONHC₆H₄CH₃, —CONHC₆H₄COOC₂H₅, —CONHCONH₂, —CONHC₆H₄COOCH₃, —CONHC₆H₃(COOCH₃)₂ or —CONH-naphthyl;

$R^3$ is hydrogen;

$R^4$ is hydrogen, Cl, OCH₃ or CH₃;

n is the number 1; and $R^5$ is hydrogen.

5. An isoindoline pigment as claimed in claim 1, wherein $R^1$ and $R^2$ together form a barbituric acid, methylbarbituric acid, phenylbarbituric acid, 2,4-dioxo-1,2,3,4-tetrahydroquinoline or 3-hydroxythionaphthene ring.

6. A process for the preparation of an isoindoline pigment as claimed in claim 1, wherein a) an isoindoline of the formula (II):

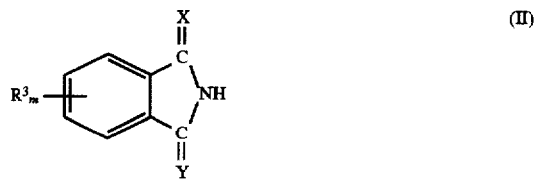

which contains nucleophilically exchangeable radicals X and Y in the 1- and 3-positions, is reacted with a compound of the formula (III):

in which the H atoms of the —CH₂— group are CH-acidic, to form a compound of the formula (IV):

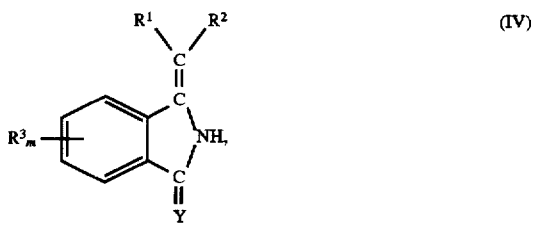

and then b) the compound of the formula (IV) is reacted with a quinoxalinedione of the formula (V):

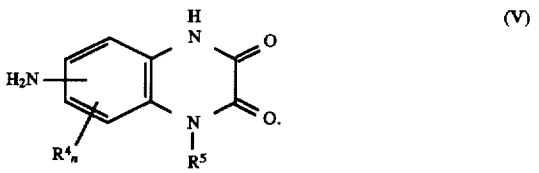

7. A process as claimed in claim 6, wherein step a) is carried out at a temperature of 30° to 60° C., and at a pH of 5 to 9.

8. A process as claimed in claim 6, wherein step a) is carried out at a temperature of 45° to 55° C., and at a pH of 6 to 8.5.

9. A process as claimed in claim 6, wherein the reaction in step b) is carried out with a 6-aminoquinoxalinedione.

10. A process as claimed in claim 6, wherein the radical X is an imino group or a (hemi) aminal or ketal grouping and the radical Y is an imino group.

11. A method of pigmenting high-molecular organic materials comprising the step of incorporating the isoindoline pigments as claimed in claim 1 into said high-molecular organic materials.

12. The method as claimed in claim 11, wherein the high-molecular organic material is a printing ink, lacquer, plastic, electrophotographic toner and developer, powder and powder coating which can be sprayed triboelectrically or electrokinetically, or an ink-jet ink.

* * * * *